US012750876B2

(12) United States Patent
Polaganga et al.

(10) Patent No.: US 12,750,876 B2
(45) Date of Patent: Sep. 29, 2026

(54) OPTIMIZATION OF CARRIER AGGREGATION (CA) FOR USER EQUIPMENT (UE) EXPERIENCE

(71) Applicant: T-Mobile USA, Inc., Bellevue, WA (US)

(72) Inventors: Roopesh Kumar Polaganga, Bothell, WA (US); Sanjay Baburao Waje, Plano, TX (US); Sesha Kiran Gonaboyina, Dallas, TX (US)

(73) Assignee: T-Mobile USA, Inc., Bellevue, WA (US)

( * ) Notice: Subject to any disclaimer, the term of this patent is extended or adjusted under 35 U.S.C. 154(b) by 365 days.

(21) Appl. No.: 18/607,417

(22) Filed: Mar. 15, 2024

(65) Prior Publication Data

US 2025/0294604 A1 Sep. 18, 2025

(51) Int. Cl.

| | |
|---|---|
| ***H04W 72/542*** | (2023.01) |
| ***H04L 5/00*** | (2006.01) |
| ***H04W 24/02*** | (2009.01) |

(52) U.S. Cl.
CPC ......... *H04W 72/542* (2023.01); *H04L 5/0035* (2013.01); *H04L 5/0037* (2013.01); *H04L 5/006* (2013.01); *H04W 24/02* (2013.01)

(58) Field of Classification Search
CPC ..... H04L 5/006; H04L 5/0035; H04L 5/0037; H04W 24/02; H04W 72/542
See application file for complete search history.

(56) References Cited

U.S. PATENT DOCUMENTS

| | | | | |
|---|---|---|---|---|
| 10,615,945 | B1 * | 4/2020 | Holzer | H04B 1/0483 |
| 10,863,525 | B1 * | 12/2020 | Vivanco | H04L 5/0032 |
| 2016/0143046 | A1 * | 5/2016 | Gupta | H04W 28/0861 370/329 |
| 2017/0041940 | A1 * | 2/2017 | Falconetti | H04L 5/006 |
| 2018/0123885 | A1 * | 5/2018 | Stenberg | H04L 41/0853 |
| 2019/0280845 | A1 * | 9/2019 | Bedekar | H04L 5/0098 |
| 2020/0137673 | A1 * | 4/2020 | Shikari | H04W 8/04 |
| 2020/0367316 | A1 * | 11/2020 | Cili | H04W 88/06 |
| 2021/0250831 | A1 * | 8/2021 | Froehlich | H04W 24/08 |
| 2021/0289384 | A1 * | 9/2021 | Wang | H04W 8/24 |
| 2021/0377116 | A1 * | 12/2021 | Yeh | H04W 24/10 |
| 2022/0038934 | A1 * | 2/2022 | Kumar | H04W 24/10 |
| 2022/0132348 | A1 * | 4/2022 | Orsino | H04W 76/27 |

(Continued)

*Primary Examiner* — Melanie Jagannathan
(74) *Attorney, Agent, or Firm* — Foley IP Law, PLLC

(57) ABSTRACT

Carrier aggregation (CA) is optimized for user equipment (UE) experience. Various base station-centric data records from differing network nodes of a wireless network together identify: a set of layers available at a radio site, a downlink buffer size of a base station at the radio site for data to transmit to a UE, a CA capability of the UE, radio signal quality experienced by the UE, a set of radio layers used by the UE, throughput experienced by the UE, and other information. However, UE-centric information may be extracted and used to determine a target CA configuration for the UE and a target downlink throughput. By comparing the throughput experienced by the UE with the target downlink throughput, and the set of radio layers used by the UE with the target CA configuration for the UE, an anomalous CA condition may be identified and a remediation action determined.

20 Claims, 10 Drawing Sheets

(56) References Cited

U.S. PATENT DOCUMENTS

| | | | | |
|---|---|---|---|---|
| 2023/0209433 | A1* | 6/2023 | Tammana | H04W 48/12<br>370/331 |
| 2023/0403058 | A1* | 12/2023 | Khan Beigi | H04L 5/0048 |
| 2025/0193676 | A1* | 6/2025 | Sun | H04B 17/336 |
| 2025/0219788 | A1* | 7/2025 | Yerramalli | H04L 5/001 |
| 2025/0260550 | A1* | 8/2025 | Yun | H04L 5/14 |
| 2026/0019879 | A1* | 1/2026 | Wang | H04W 28/12 |

* cited by examiner

FIG. 5

500

| | UE identity 501 | Site identity 502 | BW per layer 503 | Site CA usage 504 | UE ntwrk usage 505 | UE CA capability 506 | Signal quality 507 | DL buffer size 508 | UE thruput 509 | UE CA usage 510 | Target thruput 511 | Target CA cnfig 512 | Anomaly detected 513 |
|---|---|---|---|---|---|---|---|---|---|---|---|---|---|
| 521 | UE 102 [104] | Site 200 [362] | 100MHz (n41) 10MHz (n25) 20MHz (n71) [331] | 3CC 50% 2CC 20% None 30% [332] | Data only [312] | n41+n25 +n71; n41+n71 [383] | n41: -100dbm (RSRP) [324] | 500 MB [313] | 100 Mbps [314] | n41+n71 [322] | 500 Mbps [136] | n41+n25 +n71 [134] | Yes [601] |
| 522 | UE-B | Site-B | 100MHz (n41) 20MHz (n71) | 2CC 50% None 50% | Data only | n41+n25 +n71; n41+n71 | n41: -110dbm (RSRP) | 200 MB | 75 Mbps | n41+n71 | 100 Mbps | n41+71 | No |
| 523 | UE-C | Site-C | 100MHz (n41) 20MHz (n71) | 2CC 50% None 50% | Voice + data | n41+n25 +n71; n41+n71 | n41: -100dbm (RSRP) | 200 MB | 50 Mbps | n41 (no CA) | 50 Mbps | n41 (no CA) | No |

OPTIMIZATION OF CARRIER AGGREGATION (CA) FOR USER EQUIPMENT (UE) EXPERIENCE

BACKGROUND

Modern cellular networks use may use carrier aggregation (CA) to provide increased bandwidth for user equipment (UEs) on the networks. Radio access network (RAN) data collection mechanisms capture resource utilization of cell sites (i.e., locations where multiple cells co-exist with overlapping coverage) such that the cell site's CA performance and activity may be readily-determined. However, RAN data collection mechanisms do not capture data in a manner suitable for determination of UE performance with regard to CA. Thus, identification of, and insight into, sub-optimal UE experience with CA is not practical.

SUMMARY

The following summary is provided to illustrate examples disclosed herein, but is not meant to limit all examples to any particular configuration or sequence of operations.

Solutions are disclosed that optimize carrier aggregation (CA) for user equipment (UE) experience. Examples receive a plurality of data records from differing ones of a plurality of wireless network nodes of a wireless network, the plurality of data records including a first data record and a second data record different than the first data record, the plurality of data records together identifying: a set of layers available at a first radio site, a downlink buffer size of a first base station at the first radio site for data to transmit to a first UE, a carrier aggregation (CA) capability of the first UE, radio signal quality experienced by the first UE, and a set of layers used by the first UE; determine a target CA configuration for the first UE using at least the set of layers available at the first radio site, the downlink buffer size for data to transmit to the first UE, the CA capability of the first UE, and the radio signal quality experienced by the first UE; and determine an occurrence of a first CA anomaly for the first UE using at least the target CA configuration for the first UE and the set of layers used by the first UE.

BRIEF DESCRIPTION OF THE DRAWINGS

The disclosed examples are described below with reference to the accompanying drawing figures listed below, wherein:

FIG. 5 illustrates another exemplary data chart, compiled using the data charts of FIG. 4;

Figure 1:
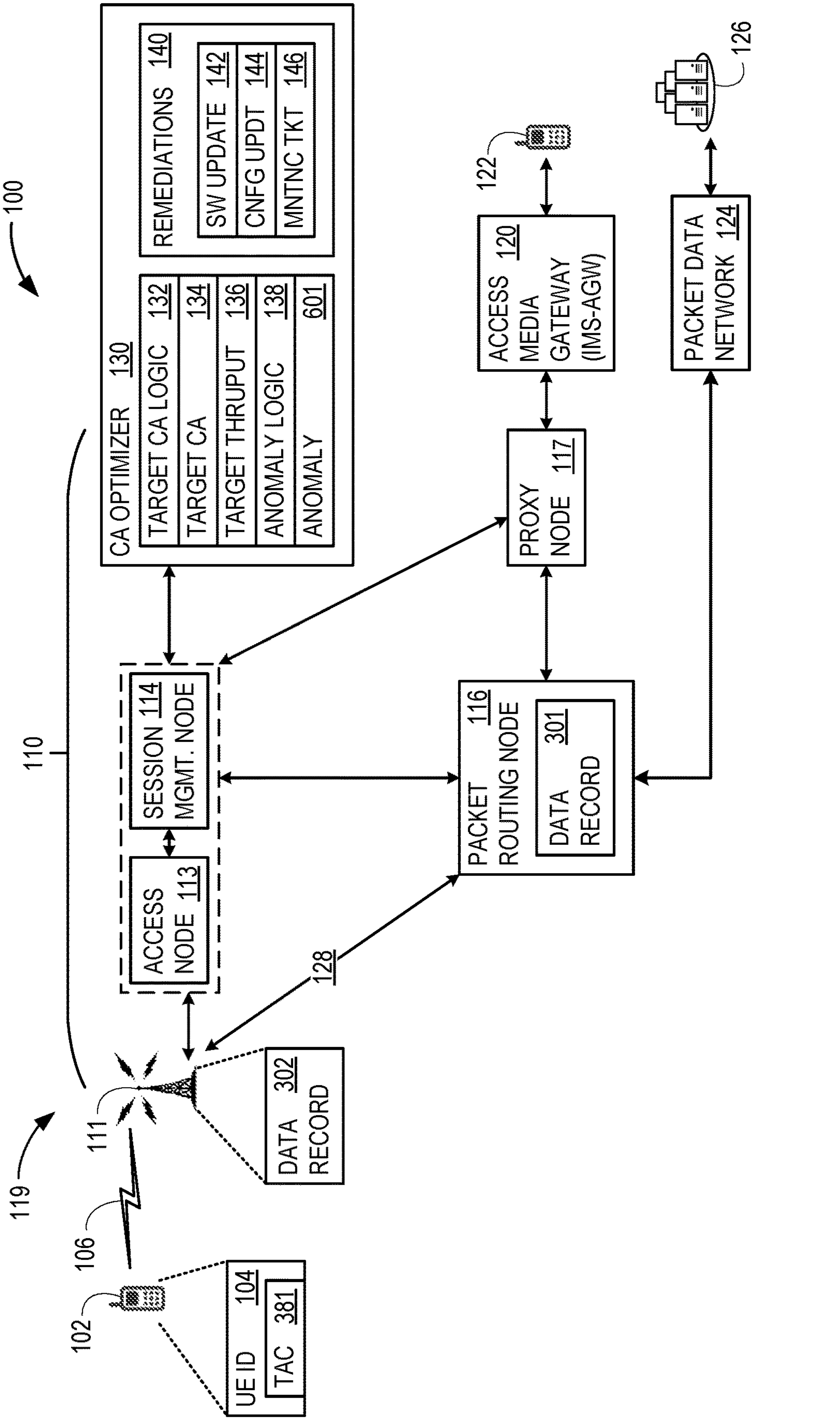
FIG. 1 illustrates an exemplary architecture that advantageously optimizes carrier aggregation (CA) for user equipment (UE) experience.

Corresponding reference characters indicate corresponding parts throughout the drawings. References made throughout this disclosure. relating to specific examples, are provided for illustrative purposes, and are not meant to limit all implementations or to be interpreted as excluding the existence of additional implementations that also incorporate the recited features.

DETAILED DESCRIPTION

Carrier aggregation (CA) is optimized for user equipment (UE) experience. Various base station-centric data records from differing network nodes of a wireless network (e.g., a cellular network) together identify: a set of layers available at a radio site, a downlink buffer size of a base station at the radio site (e.g., a cell site) for data to transmit to a UE, a CA capability of the UE, radio signal quality experienced by the UE, a set of radio layers used by the UE, throughput experienced by the UE, and other information. However, UE-centric information may be extracted and used to determine a target CA configuration for the UE and a target downlink throughput. By comparing the throughput experienced by the UE with the target downlink throughput, and the set of radio layers used by the UE with the target CA configuration for the UE, an anomalous CA condition may be identified and a remediation action determined. Further investigation permits determining whether anomalous CA conditions track a radio site, indicating that a base station at the radio site needs corrective action, or a UE, indicating that the UE could use a software update.

Data collection mechanisms capture resource utilization of cell sites (i.e., locations where multiple cells co-exist with overlapping coverage) such that the cell site's CA performance and activity may be readily-determined. However, existing data collection mechanisms do not capture data in a manner suitable for determination of UE performance with regard to CA. Thus, identification of, and insight into, sub-optimal UE experience with CA is not practical with prior solutions.

Multiple reasons exist for sub-optimal CA performance, such as incorrect CA configurations at a radio site (i.e., defective logic and/or data at a base station), abnormal UE behavior (device issues), radio coverage issues (antenna tilt and/or interference), and network congestion. Solutions introduced herein build UE-centric CA performance data from disparate sources, leveraging this performance data to provide insights, and taking action to alleviate causes of sub-optimal UE CA experiences.

Aspects of the disclosure thus improve the performance of cellular networks by remediating underperforming CA operations caused by poor base station or UE configuration. This reduces negative impacts on a larger number of network users, when the conditions are identified so that they may be remedied. These advantageous results are accomplished, at least in part by, determining a target CA configuration for a UE using at least the set of layers available at a radio site, the downlink buffer size for data to transmit to the UE, the CA capability of the UE, and the radio signal quality experienced by the UE; and determining an occurrence of an CA anomaly for the UE using at least the target CA configuration for the UE and the set of layers used by the UE.

With reference now to the figures, FIG. 1 illustrates an exemplary architecture 100 that advantageously optimizes CA for UE experience. A wireless network 110 is illustrated that is serving a UE 102. UE 102 may be an enhanced Mobile Broadband (eMBB) or cellphone, a fixed wireless access (FWA), internet of things (IoT) device, machine-to-machine (M2M) communication device, a personal computer (PC, e.g., desktop, notebook, tablet, etc.) with a cellular modem, or another telecommunication devices capable of using a wireless network. In the scene depicted in FIG. 1, UE 102 is using wireless network 110 for a packet data session to reach a network resource 126 (e.g., a website) across an external packet data network 124 (e.g., the internet). In some scenarios, UE 102 may use wireless network 110 for a phone call with another UE 122. Wireless network 110 may be a cellular network such as a fifth generation (5G) network, a fourth generation (4G) network, or another cellular generation network. In some contexts, 5G is also referred to as new radio (NR), and standalone 5G, which is a full 5G implementation that does not rely on 4G technology for some functionality, may be referred to SA NR.

UE 102 uses an air interface 106 to communicate with a base station 111 of wireless network 110, such that base station 111 is the serving base station for UE 102 (providing the serving cell). In some scenarios, base station 111 may be referred to as a radio access network (RAN). Wireless network 110 has an access node 113, a session management node 114, and other components (not shown). Wireless network 110 also has a packet routing node 116 and a proxy node 117. Access node 113 and session management node 114 are within a control plane of wireless network 110, and packet routing node 116 is within a data plane (a.k.a. user plane) of wireless network 110.

Base station 111 is in communication with access node 113 and packet routing node 116. Access node 113 is in communication with session management node 114, which is in communication with packet routing node 116 and proxy node 117. Packet routing node 116 is in communication with proxy node 117 and packet data network 124. In some 5G examples, base station 111 comprises a gNodeB (gNB), access node 113 comprises an access mobility function (AMF), session management node 114 comprises a session management function (SMF), and packet routing node 116 comprises a user plane function (UPF).

In some 4G examples, base station 111 comprises an eNodeB (eNB), access node 113 comprises a mobility management entity (MME), session management node 114 comprises a system architecture evolution gateway (SAEGW) control plane (SAEGW-C), and packet routing node 116 comprises an SAEGW-user plane (SAEGW-U). In some examples, proxy node 117 comprises a proxy call session control function (P-CSCF) in both 4G and 5G.

In some examples, wireless network 110 has multiple ones of each of the components illustrated, in addition to other components and other connectivity among the illustrated components. In some examples, wireless network 110 has components of multiple cellular technologies operating in parallel in order to provide service to UEs of different cellular generations. For example, wireless network 110 may use both a gNB and an eNB co-located at a common cell site. In some examples, multiple cells may be co-located at a common cell site, and may be a mix of 5G and 4G.

Proxy node 117 is in communication with an internet protocol (IP) multimedia system (IMS) access gateway (IMS-AGW) 120 within an IMS, in order to provide connectivity to other wireless (cellular) networks, such as for a call with a UE 122 or a public switched telephone system (PSTN, also known as plain old telephone system, POTS). In some examples, proxy node 117 may be considered to be within the IMS. UE 102 reaches network resource 126 using packet data network 124 (or the IMS, in some examples). Data packets of data traffic 128 to/from UE 102 pass through at least base station 111 and packet routing node 116 on their way from/to packet data network 124 or IMS-AGW 120 (via proxy node 117).

A CA optimizer 130 for wireless network 110 receives a plurality of data records 310 (shown in FIG. 3 and described below) from a plurality of wireless network nodes 119, which includes any of nodes 111-117 of wireless network 110. For example, packet routing node 116 has a data record 301 and base station 111 has a data record 302. Although data record 301 and data record 302 have base-station centric information, some of the data records have information indexed by specific UEs. In some examples, the UEs are identified by a UE identifier (ID) 104, which may be an international mobile equipment identity (IMEI) or an international mobile subscriber identity (IMSI). The first eight digits of an IMEI are a type allocation code (TAC), which indicates the manufacturer and model of the particular UE. In this illustrated example, a TAC 381 identifies the manufacturer and model of UE 102.

CA optimizer 130 has a target CA logic 132 which used information extracted from data record 301, data record 302, and possibly other data records, to determine a target CA configuration 134 for UE 102. In some examples, target CA logic 132 comprises machine learning (ML) or artificial intelligence (AI) (with ML and AI used synonymously here). CA optimizer 130 also uses information extracted from data record 301, data record 302, and possibly other data records, to determine a target downlink throughput 136 for UE 102.

As described more fully below, in relation to the other figures, CA optimizer 130 uses target CA configuration 134 and/or a target downlink throughput 136 in anomaly detection logic 138 to determine whether a CA anomaly 601 has occurred for UE 102 when using base station 111. If so, then upon further investigation to determine whether CA anomalies track UE 102 or base station 111, CA optimizer 130 dispatches a remediation measure 140 to correct the condition that caused CA anomaly 601, to reduce the likelihood of reoccurrence or the occurrence of another CA anomaly for other UEs. In some examples, remediation measure 140 comprises a software update 142 to UE 102, a configuration update 144 to base station 111, and/or a maintenance ticket 146 for base station 111. Other remedies may include offloading UEs from base station 111, if base station 111 is heavily loaded. In some examples, anomaly detection logic 138 comprises ML.

Although FIG. 1 and some of the following figures are described using an example of a cellular network, it should be understood that the teachings herein are applicable to other types of wireless networks. To benefit from the teachings herein, another type of wireless network should offer CA and make data record having key performance indicators (KPIs) for the CA operations available for retrieval by an equivalent of CA optimizer 130. With such features, another type of wireless network, other than a cellular network, may also benefit from the disclosure herein. Further, although CA optimizer 130 is illustrated as being a single component, it should be understood that the functionality described herein for CA optimizer 130 may be distributed among multiple nodes of wireless network 110 and/or provided as a service outside wireless network 110.

Figure 2:
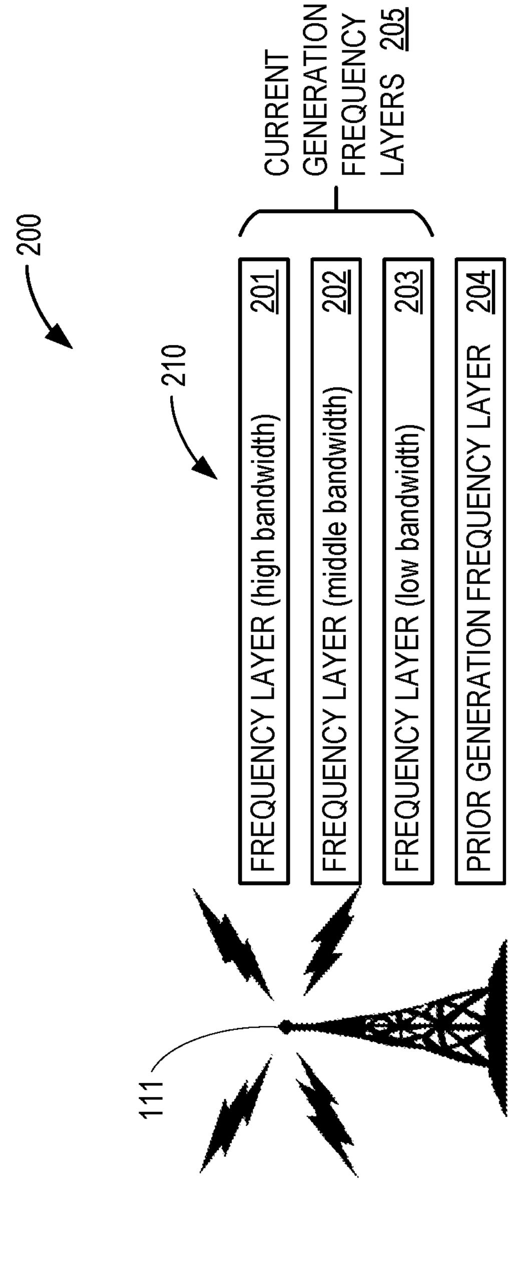
FIG. 2 illustrates an exemplary radio site as may be used in examples of the architecture of FIG. 1.

FIG. 2 illustrates radio site 200 hosting base station 111. Such an arrangement is common when a cell tower site hosts multiple cells. A similar arrangement may also exist in non-cellular wireless networks. Although all of the antennas for the various cells may be located on a single antenna tower, in some examples, other examples may use different antenna towers that are spaced closely enough to provide overlapping radio coverage.

Radio site 200 has a set of set of layers 210, which are multiple frequency layers and include a frequency layer 201, a frequency layer 202, and a frequency layer 203. In some examples, different base stations at radio site 200 provide the different frequency layers, although in some uses of the term base station, a single base station provides multiple frequency layers. In some examples, radio site 200 comprises a cell site, and each frequency layer comprises a cellular air interface frequency layer.

Frequency layers 201-203 are current radio generation frequency layers 205, with frequency layer 201 having the highest bandwidth and frequency layer 203 having the lowest bandwidth of current radio generation frequency layers 205. In some examples, frequency layer 201 is approximately 2,500 megahertz (MHz), frequency layer 202 is approximately 1,900 MHZ, and frequency layer 203 is approximately 700 MHz. Other frequencies may be used, as well as a different number of frequency layers. In this illustrated example, set of layers 210 also includes a prior radio generation frequency layer 204. CA is the simultaneous use of multiple ones of set of layers 210 by UE 102.

Figure 3:
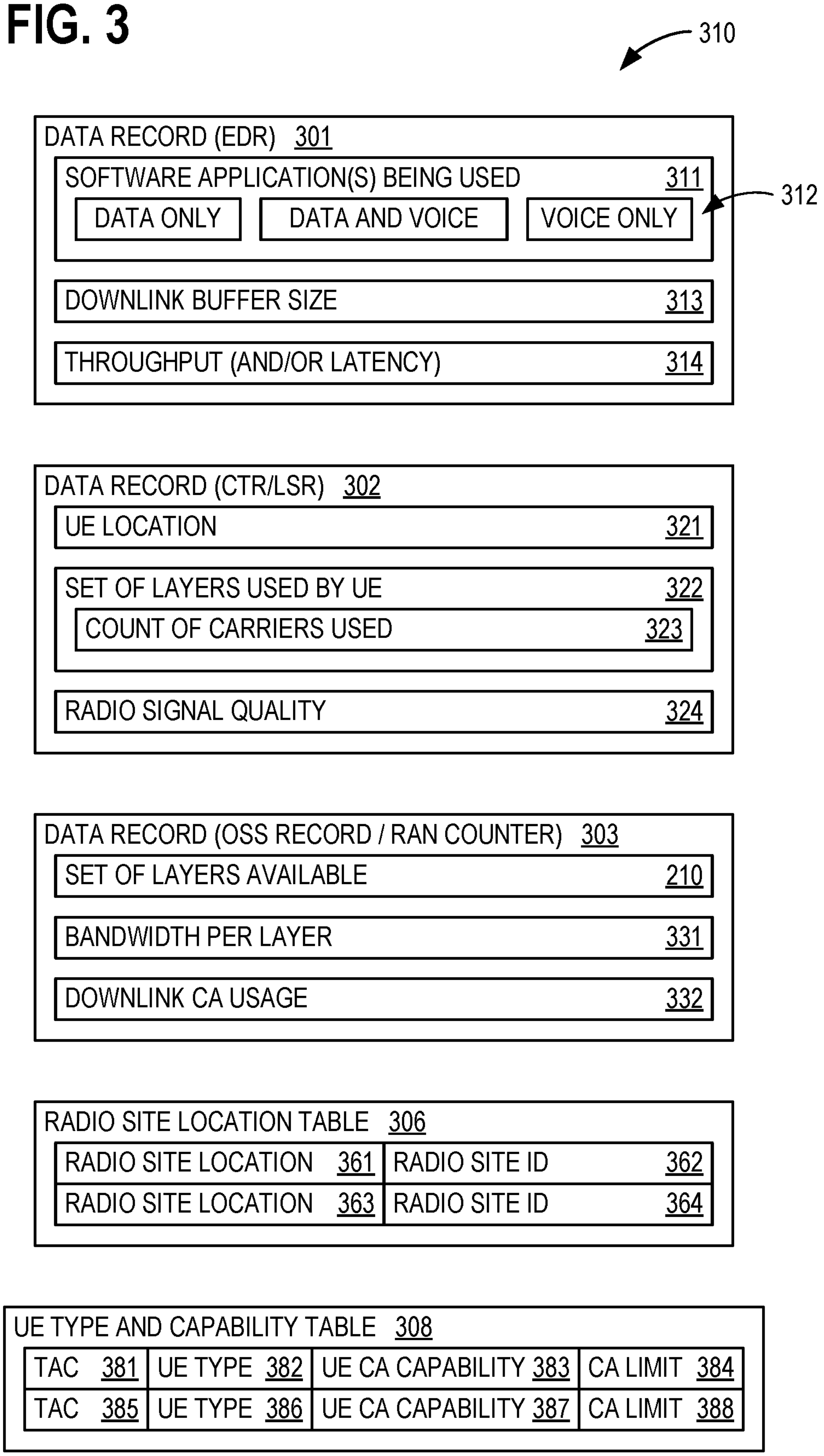
FIG. 3 illustrates exemplary data files used in examples of the architecture of FIG. 1.

FIG. 3 illustrates exemplary data files used in examples of architecture 100, identified as a plurality of data records 310. Plurality of data records 310 includes a data record 301, a data record 302, a data record 303, a radio site location table 306, and a UE Type and capability table 308. In some examples, data record 301 comprises an enhanced data record (EDR), which may also be known as an event data record. In some examples, data record 301 is received from packet routing node 116. Data record 301 has information indexed by UE ID, typically one data set per (one record) per data session for a specific UE.

Data record 301 is shown as containing a software application 311 (an indication of the software application) executed by UE 102, which indicates a type of use 312 that UE 102 is making of wireless network 110, such as data only, data and voice, or voice only. Thus, type of use 312 indicates whether voice is being used by UE 102. A downlink buffer size 313 of base station 111 for data to transmit to UE 102 is determined from download payload information. Data record 301 also has a throughput 314 and/or latency experienced by UE 102. Throughput and latency are typically related, enabling estimation of one from the other.

In some examples, data record 302 comprises a call trace record (CTR) or a location session record (LSR), and may be received from base station 111. Data record 302 also has information indexed by UE ID, and is shown as containing a location 321 of UE 102 (e.g., latitude and longitude coordinates), a set of layers 322 (i.e., frequency layers) used by UE 102, and a radio signal quality 324 experienced by UE 102. Set of layers 322 enables determination of a count of carriers 323 used by UE 102. In some examples, radio signal quality 324 is expressed using Reference Signal Received Power (RSRP), Reference Signal Received Quality (RSRQ), and/or Signal-to-Interference-plus-Noise Ratio (SINR).

In some examples, data record 303 comprises an operating support system (OSS) record and/or a RAN counter, and has information and indexed by cell site (radio site) or base station. Data record 303 is shown as having an indication of set of layers 210 available at radio site 200, a bandwidth per available layer 331 for set of layers 210, and an indication of downlink CA usage 332 at radio site 200.

Radio site location table 306 shows radio site IDs by location. For example, a radio site location 361 of radio site 200 has a radio site ID 362 (indicating radio site 200), and another radio site location 363 of another radio site 200 has a radio site ID 364. In some examples, location 321 of UE 102 is used to identify the nearest radio site location (e.g., radio site location 361). This gives the identity of the relevant radio site 200, such as by radio site ID 362 indicating radio site 200.

UE Type and capability table 308 shows UE model information UE type, indexed by TAC. For example, TAC 381 indicates a UE type 382 of UE 102, with an indication of the UE's advertised CA capability as a UE CA capability 383. In some example, there is also a CA limit 384, such as whether use of CA is disfavored when a UE of that type is using voice. UE Type and capability table 308 also has another TAC 385 indicating a UE type 386, a UE CA capability 387 (for UE type 386) and, in some examples, a CA limit 388.

Figure 4:
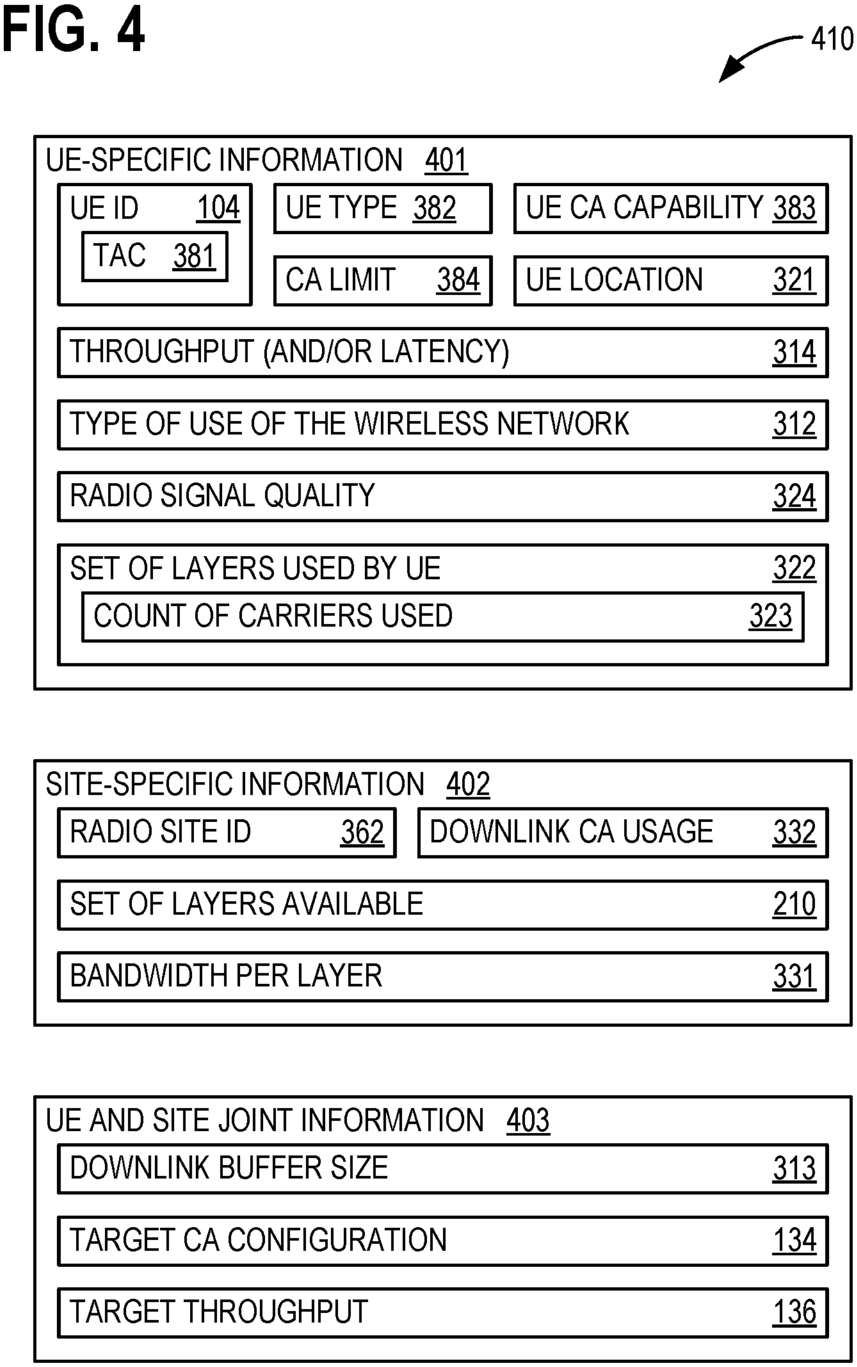
FIG. 4 illustrates exemplary data charts, compiled using the data files of FIG. 3.

FIG. 4 illustrates exemplary data charts 410 of information extracted from plurality of data records 310 and possible other data sources, such as a UE self-report of CA capability. Examples of architecture 100 may not explicitly create data charts 410 illustrated in FIG. 4; these charts are provided to illustrate the extraction of UE-centric information from base station-centric data sources (plurality of data records 310).

A chart 401 has UE-specific information, such as UE ID 104 that includes TAC 381, UE type 382, UE CA capability 383, CA limit 384, and location 321 of UE 102. Chart 401 also has throughput 314 and/or latency experienced by UE 102, type of use 312 that UE 102 is making of wireless network 110, radio signal quality 324 experienced by UE 102, set of layers 322 used by UE 102, count of carriers 323 used by UE 102.

A chart 402 has radio site-specific information such as radio site ID 362 for radio site 200, set of layers 210 available at radio site 200, bandwidth per available layer 331 for set of layers 210, and downlink CA usage 332 at radio site 200.

A chart 403 has combined UE and radio site information, such as downlink buffer size 313 of base station 111 for data to transmit to UE 102. Chart 403 also has target CA configuration 134 for UE 102, derived using set of layers 210, downlink buffer size 313, UE CA capability 383, and radio signal quality 324. In some examples, type of use 312 is also included, such as when use of voice disfavors using CA at all. Chart 403 also has target downlink throughput 136 for UE 102, derived using target CA configuration 134, and bandwidth per available layer 331.

FIG. 5 illustrates another exemplary data chart 500, compiled using data charts shown in FIG. 4. Data chart 500 has 13 columns: a UE identity column 501, a site identity column 502, a bandwidth per layer column 503, a site CA usage column 504, a UE network usage column 505, a UE CA capability column 506, a radio signal quality column 507, a downlink buffer size column 508, a UE throughput column 509, a UE CA usage column 510, a target downlink throughput column 511, a target CA configuration column 512, and a CA anomaly detected column 513.

Data chart 500 also has three UE-specific rows: a row 521 for UE 102, a row 522 for another UE identified as "UE-B", and a row 523 for yet another UE identified as "UE-C". For UE 102 in row 521, UE identity column 501 has UE ID 104, site identity column 502 has radio site ID 362, bandwidth per layer column 503 has bandwidth per available layer 331, site CA usage column 504 has downlink CA usage 332, UE network usage column 505 has type of use 312, UE CA capability column 506 has UE CA capability 383, radio signal quality column 507 has radio signal quality 324 experienced by UE 102, downlink buffer size column 508 has downlink buffer size 313, UE throughput column 509 has throughput 314, UE CA usage column 510 has set of layers 322 used by UE 102, target downlink throughput column 511 has target downlink throughput 136, and target CA configuration column 512 has target CA configuration 134.

For the illustrated example, in row 521 for UE 102, target downlink throughput 136 is 500 megabits per second (Mbps), while the actual throughput 314 experienced by UE 102 is only 100 Mbps. This may be at least partially explained by target CA configuration 134 showing 3 aggregated carriers, while the actual result is only 2 carriers used by UE 102 (see set of layers 322 used by UE 102 in UE CA usage column 510). This, CA anomaly detected column 513 indicates an anomaly (CA anomaly 601).

For the illustrated example, in row 522, the target downlink throughput is 100 Mbps, while the actual throughput is only 75 Mbps. However, no anomaly is indicated in CA anomaly detected column 513. This is because examples of architecture 100 may use dynamic thresholding, to account for network and radio conditions explaining poor throughput. In this examples, radio signal quality column 507 indicates poor radio signal quality at −110 decibels milliwatt (dbm), which is 10 dBM below the radio signal quality of the other UEs.

For the illustrated example, in row 523, the target CA configuration is no CA, because for at least UE-C, when voice is used (see UE network usage column 505) use of CA is disfavored. Thus, even though the UE is capable of CA, there is no CA anomaly even when CA is not used. This may be indicated in the equivalent of CA limit 384 for UE-C.

Figure 6:
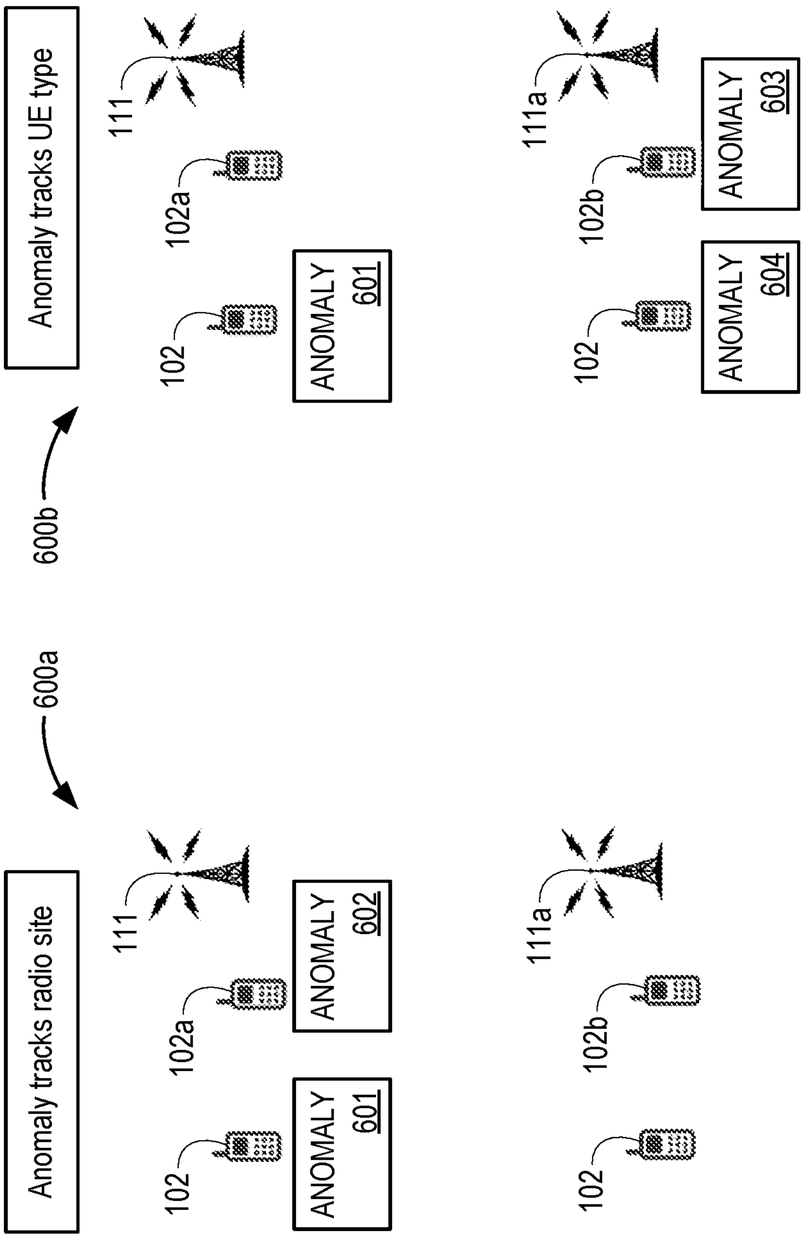
FIG. 6 illustrates an exemplary diagnosis scheme to identify whether a CA anomaly tracks a base station or a user equipment (UE) type, as may be used in examples of the architecture of FIG. 1.

FIG. 6 illustrates an exemplary diagnosis scheme to identify whether a CA anomaly tracks a base station or a UE type. FIG. 6 shows two scenarios: a first scenario 600*a*, in which CA anomalies track base station 111, and a second scenario 600*b*, in which CA anomalies track UE 102 and other UEs having the same UE type 382.

In scenario 600*a*, UE 102 has CA anomaly 601, and another UE 102*a* has a CA anomaly 602. Both UE 102 and UE 102*a* are using base station 111, and UE 102*a* has a different UE type than does UE 102. For example, while UE 102 has UE type 382, UE 102*a* has UE type 386. Meanwhile, when UE 102 moves to another base station 111*a* at another radio site, it does not experience a CA anomaly. Neither does another UE 102*b*, which is also using base station 111*a*, and which has the same UE type 382 as UE 102.

In contrast, in scenario 600*b*, UE 102 has CA anomaly 601 but UE 102*a* does not have a CA anomaly 602 when both UE 102 and UE 102*a* are using base station 111. However, UE 102*b*, which is also UE type 382 (the same as UE 102), has a CA anomaly 603 when using base station 111*a*. Alternatively (or additionally), when UE 102 moves to base station 111*a*, it experiences a CA anomaly 604.

Figure 7:
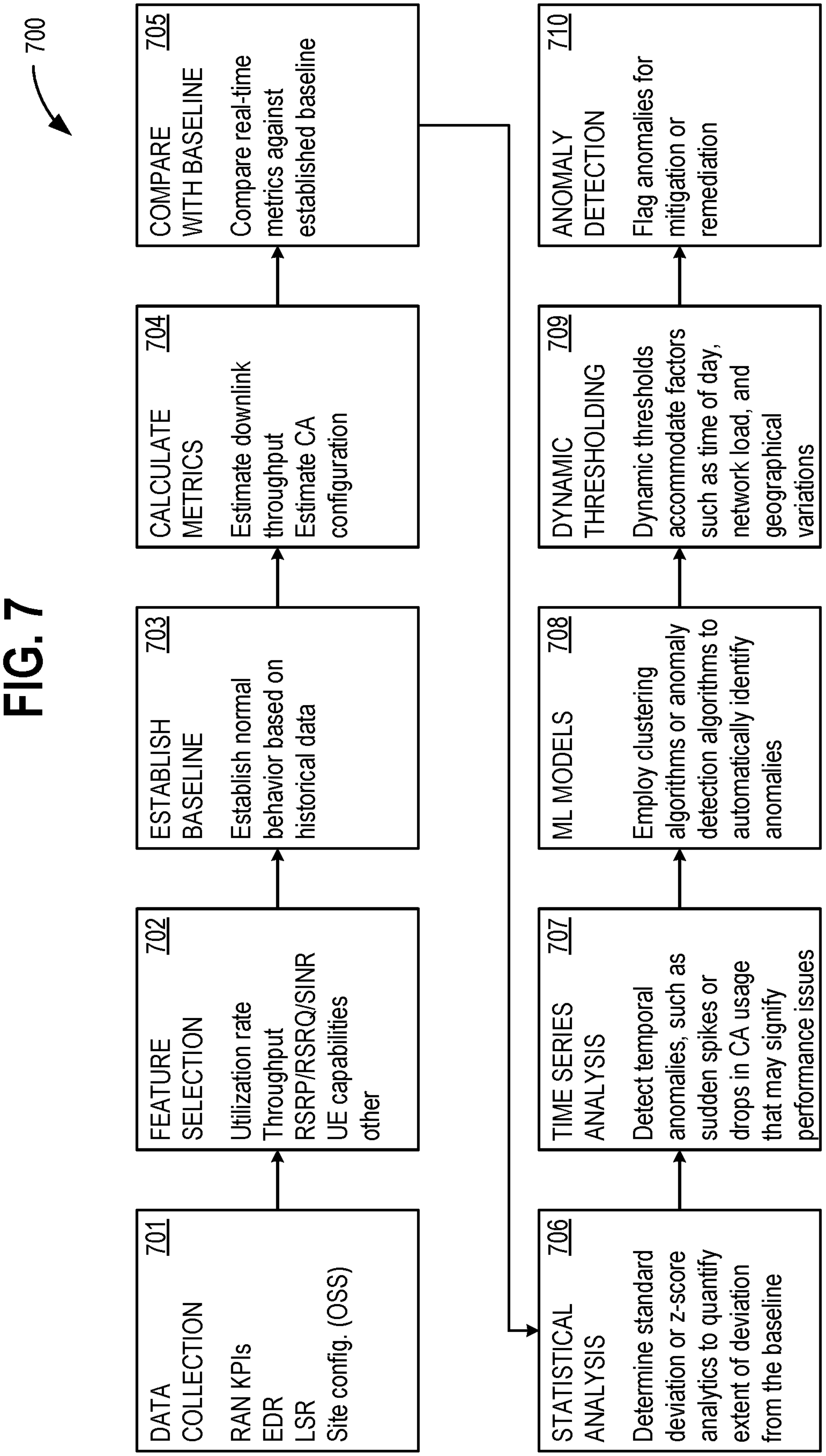
FIG. 7 illustrates an exemplary workflow associated with examples of the architecture of FIG. 1.

FIG. 7 illustrates an exemplary workflow 700 associated with examples architecture 100. Workflow 700 illustrates an example of stages of a process that may be performed by examples of architecture 100, using the specific operations identified in FIG. 8, and includes multiple interconnected stages aimed at effectively detecting anomalies in CA utilization, such as NRCA utilization. Each stage plays a significant role in the overall anomaly detection process.

A stage 701 of workflow 700 is identified as Data Collection. Data is collected from diverse sources, including RAN KPIs, Engineering Data Records (EDR), Location Session Records (LSR), and Operational Support System (OSS) Site configurations. This comprehensive data collection ensures a holistic view of the network's operational environment. A stage 702 of workflow 700 is identified as Feature Selection, in which relevant features such as utilization rate, throughput, RSRP, RSRQ, SINR) and UE capabilities are selected for analysis. These features serve as key indicators of NRCA utilization performance.

A stage 703 of workflow 700 is Baseline Establishment. Historical data is utilized to establish a baseline representing normal behavior in NRCA utilization. By analyzing past performance trends, typical patterns and variations are identified to serve as a reference for anomaly detection. A stage 704 of workflow 700 is Metric Calculation. Various metrics, including downlink throughput estimation and CA configuration estimation, are calculated based on real-time data. These metrics provide insights into current network performance and facilitate anomaly detection.

A stage 705 of workflow 700 is Baseline Comparison. Real-time metrics are compared against the established baseline to identify deviations indicative of anomalies. Discrepancies between observed and expected behavior trigger further investigation into potential performance issues. A stage 706 of workflow 700 is Statistical Analysis. Statistical techniques such as standard deviation or z-score analytics are applied to quantify the extent of deviation from the baseline. This stage provides a quantitative assessment of anomaly severity, aiding in prioritization of remedial actions.

A stage 707 of workflow 700 is Time Series Analysis. Temporal anomalies, such as sudden spikes or drops in CA usage, are detected through time series analysis. By monitoring CA utilization trends over time, abnormal patterns requiring attention are identified. A stage 708 of workflow 700 is ML Models. Advanced ML algorithms, including clustering and anomaly detection models, are employed to automatically identify anomalies. These ML models enhance the system's capability to detect complex and subtle deviations from normal behavior.

A stage 709 of workflow 700 is Dynamic Thresholding. Dynamic thresholds are established to accommodate factors such as time of day, network load, and geographical variations. This adaptive approach ensures robust anomaly detection across diverse operating conditions. A stage 710 of workflow 700 is Anomaly Detection. Anomalies detected through the preceding stages 701-709 are flagged for mitigation or remediation. Timely intervention based on anomaly alerts helps maintain optimal NRCA utilization and network performance.

Figure 8:
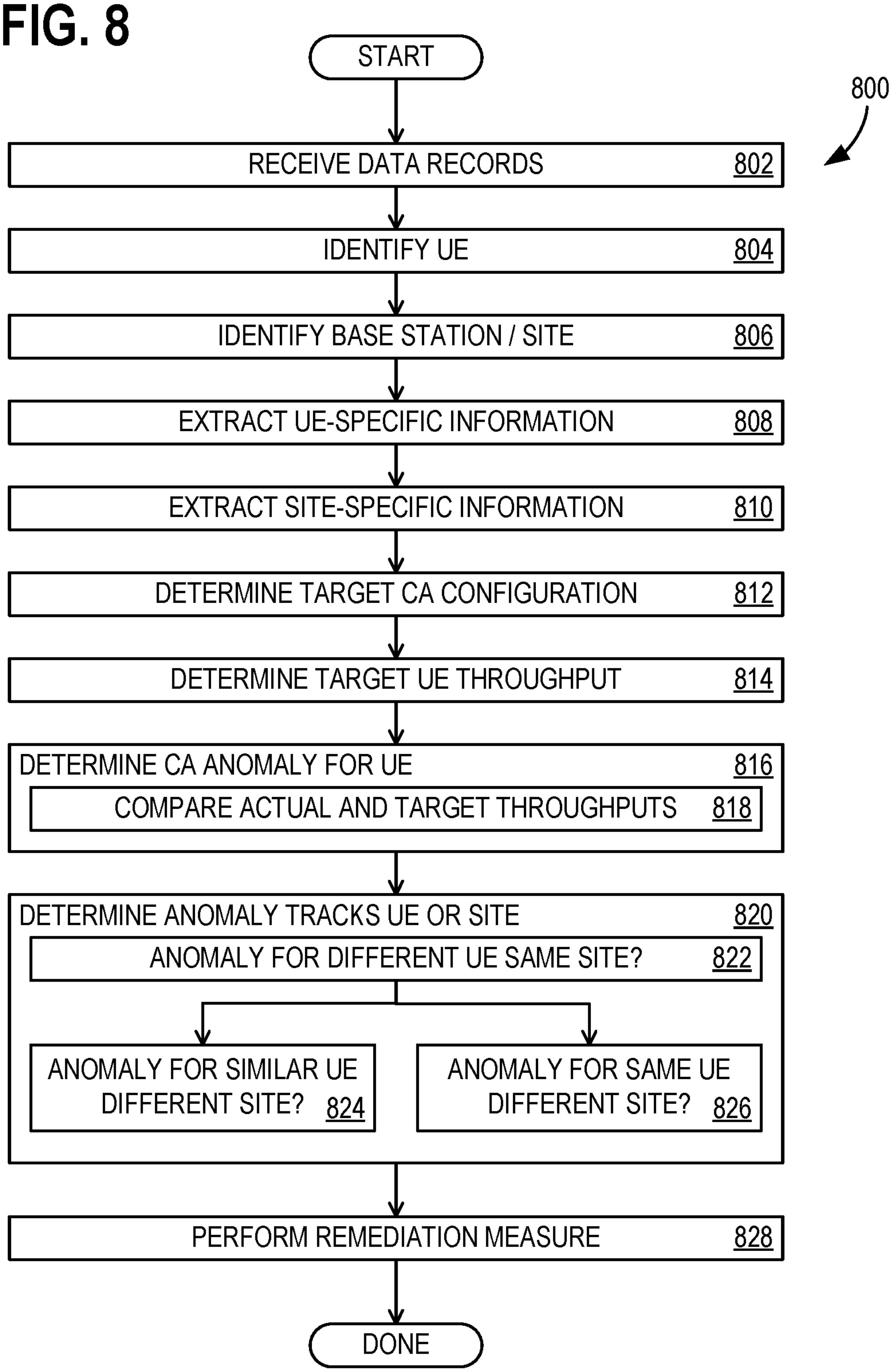
FIGS. 8 and 9 illustrate flowcharts of exemplary operations associated with the architecture of FIG. 1.

FIG. 8 illustrates a flowchart 800 of exemplary operations associated with architecture 100. In some examples, at least a portion of flowchart 800 may be performed using one or more computing devices 1000 of FIG. 10. Flowchart 800 commences with receiving plurality of data records 310 from differing ones of plurality of wireless network nodes 119 of wireless network 110, in operation 802. In some examples, Operation 804 determines UE ID 104 of UE 102, location 321 of UE 102, UE type 382, and UE CA capability 383. Operation 806 determines radio site ID 362 of radio site 200 using location 321 of UE 102. Operation 808 extracts UE-specific information, such as determining type of use 312 of wireless network 110 by UE 102, radio signal quality 324 experienced by UE 102, throughput 314 and/or the latency experienced by UE 102, set of layers 322 used by UE 102, and count of carriers 323 used by UE 102.

Operation 810 determines site-specific information, such as set of layers 210 available at radio site 200, bandwidth per available layer 331 at radio site 200, downlink CA usage 332 at radio site 200, and downlink buffer size 313 of base station 111 at radio site 200 for data to transmit to UE 102.

Operation 812 determines target CA configuration 134 for UE 102 using at least set of layers 210 available at radio site 200, downlink buffer size 313 for data to transmit to UE 102, the UE CA capability 383 of UE 102, and radio signal quality 324 experienced by UE 102. In some examples, target CA configuration 134 for UE 102 is based on at least type of use 312 of wireless network 110 by UE 102. In some examples, ML determines target CA configuration 134. Operation 814 determines target downlink throughput 136 for UE 102 using at least target CA configuration 134 for UE 102, bandwidth per available layer 331, and radio signal quality 324 experienced by UE 102;

Operation 816 determines an occurrence of CA anomaly 601 for UE 102 using at least target CA configuration 134 for UE 102 and set of layers 322 used by UE 102. In some examples, ML determines the occurrences of the anomalies. In some examples, operation 816 is performed using operation 818, which compares throughput 314 experienced by UE 102 with target downlink throughput 136.

Operation 820 determining whether CA anomaly 601 tracks UE 102 or tracks base station 111, and may be performed using operations 822-826. Operation 822 determines whether CA anomaly 602 exists for UE 102*a* when using base station 111. Operation 824 then determines whether CA anomaly 603 exists for UE 102*b* using base station 111*a*, or alternatively, operation 826 determines whether CA anomaly 604 exists for UE 102 when using base station 111*a*.

Based on at least determining the occurrence of CA anomaly 601, operation 828 performs remediation measure 140, which may be pushing software update 142 to UE 102 (if CA anomaly 601 tracks UE 102), pushing configuration update 144 to base station 111 if CA anomaly 601 tracks base station 111), and generating maintenance ticket 146 for base station 111. Other remedies may include offloading UEs from base station 111, if base station 111 is heavily loaded.

Figure 9:
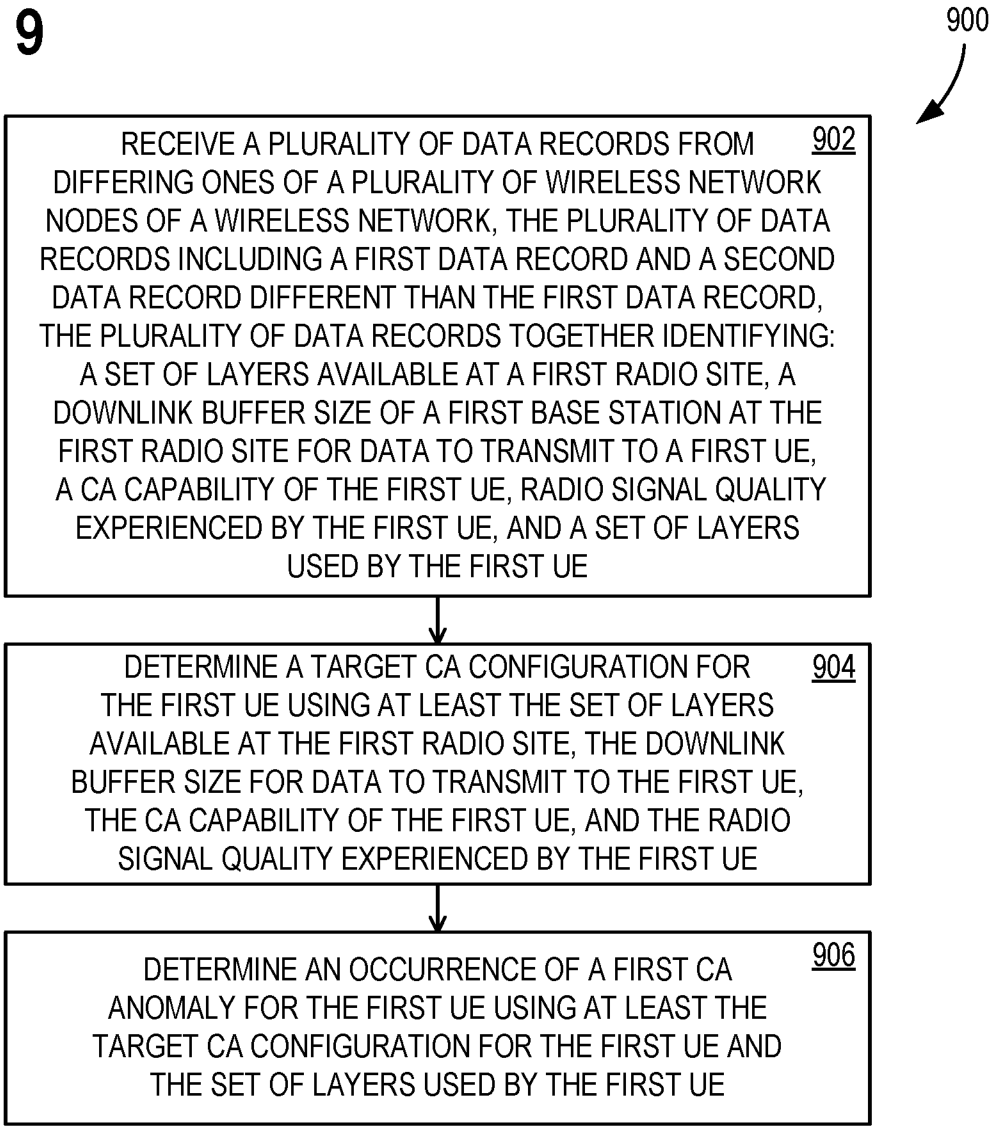

FIG. 9 illustrates a flowchart 900 of exemplary operations associated with examples of architecture 100. In some examples, at least a portion of flowchart 900 may be performed using one or more computing devices 1000 of FIG. 10. Flowchart 900 commences with operation 902, which includes receiving a plurality of data records from differing ones of a plurality of wireless network nodes of a wireless network, the plurality of data records including a first data record and a second data record different than the first data record, the plurality of data records together identifying: a set of layers available at a first radio site, a downlink buffer size of a first base station at the first radio site for data to transmit to a first UE, a CA capability of the first UE, radio signal quality experienced by the first UE, and a set of layers used by the first UE.

Operation 904 includes determining a target CA configuration for the first UE using at least the set of layers available at the first radio site, the downlink buffer size for data to transmit to the first UE, the CA capability of the first UE, and the radio signal quality experienced by the first UE. Operation 906 includes determining an occurrence of a first CA anomaly for the first UE using at least the target CA configuration for the first UE and the set of layers used by the first UE.

Figure 10:
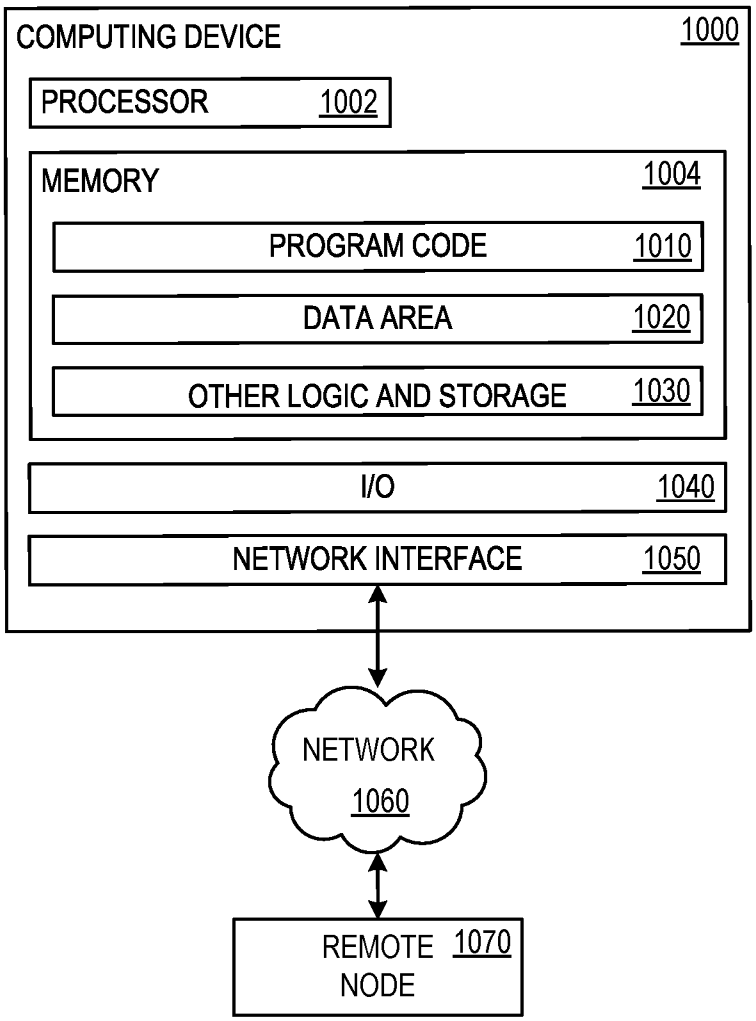
FIG. 10 illustrates a block diagram of a computing device suitable for implementing various aspects of the disclosure.

FIG. 10 illustrates a block diagram of computing device 1000 that may be used as any component described herein that may require computational or storage capacity. Computing device 1000 has at least a processor 1002 and a memory 1004 that holds program code 1010, data area 1020, and other logic and storage 1030. Memory 1004 is any device allowing information, such as computer executable instructions and/or other data, to be stored and retrieved. For example, memory 1004 may include one or more random access memory (RAM) modules, flash memory modules, hard disks, solid-state disks, persistent memory devices, and/or optical disks. Program code 1010 comprises computer executable instructions and computer executable components including instructions used to perform operations described herein. Data area 1020 holds data used to perform operations described herein. Memory 1004 also includes other logic and storage 1030 that performs or facilitates other functions disclosed herein or otherwise required of computing device 1000. An input/output (I/O) component 1040 facilitates receiving input from users and other devices and generating displays for users and outputs for other devices. A network interface 1050 permits communication over external network 1060 with a remote node 1070, which may represent another implementation of computing device 1000. For example, a remote node 1070 may represent another of the above-noted nodes within architecture 100.

Additional Examples

An example system comprises: a processor; and a computer-readable medium storing instructions that are operative upon execution by the processor to: receive a plurality of data records from differing ones of a plurality of wireless network nodes of a wireless network, the plurality of data records including a first data record and a second data record different than the first data record, the plurality of data records together identifying: a set of layers available at a first radio site, a downlink buffer size of a first base station at the first radio site for data to transmit to a first UE, a carrier aggregation (CA) capability of the first UE, radio signal quality experienced by the first UE, and a set of layers used by the first UE; determine a target CA configuration for the first UE using at least the set of layers available at the first radio site, the downlink buffer size for data to transmit to the first UE, the CA capability of the first UE, and the radio signal quality experienced by the first UE; and determine an occurrence of a first CA anomaly for the first UE using at least the target CA configuration for the first UE and the set of layers used by the first UE.

An example method of wireless communication comprises: receiving a plurality of data records from differing ones of a plurality of wireless network nodes of a wireless network, the plurality of data records including a first data record and a second data record different than the first data record, the plurality of data records together identifying: a set of layers available at a first radio site, a downlink buffer size of a first base station at the first radio site for data to transmit to a first UE, a CA capability of the first UE, radio signal quality experienced by the first UE, and a set of layers used by the first UE; determining a target CA configuration for the first UE using at least the set of layers available at the first radio site, the downlink buffer size for data to transmit to the first UE, the CA capability of the first UE, and the radio signal quality experienced by the first UE; determining an occurrence of a first CA anomaly for the first UE using at least the target CA configuration for the first UE and the set of layers used by the first UE.

One or more example computer storage devices has computer-executable instructions stored thereon, which, upon execution by a computer, cause the computer to perform operations comprising: receiving a plurality of data records from differing ones of a plurality of wireless network nodes of a wireless network, the plurality of data records including a first data record and a second data record different than the first data record, the plurality of data records together identifying: a set of layers available at a first radio site, a downlink buffer size of a first base station at the first radio site for data to transmit to a first UE, a CA capability of the first UE, radio signal quality experienced by the first UE, and a set of layers used by the first UE; determining a target CA configuration for the first UE using at least the set of layers available at the first radio site, the downlink buffer size for data to transmit to the first UE, the CA capability of the first UE, and the radio signal quality experienced by the first UE; determining an occurrence of a first CA anomaly for the first UE using at least the target CA configuration for the first UE and the set of layers used by the first UE.

Alternatively, or in addition to the other examples described herein, examples include any combination of the following:

- the wireless network comprises a cellular network;
- the first radio site comprises a cell site;
- the UEs each comprises an eMBB or cellular telephone, or an FWA;
- based on at least determining the first CA anomaly, performing a remediation measure selected from pushing a software update to the first UE, pushing a configuration update to the first base station, and generating a maintenance ticket for the first base station;
- determining whether the first CA anomaly tracks the first UE or tracks the first base station;
- pushing the software update to the first UE is based on at least determining that the first CA anomaly tracks the first UE;
- pushing the configuration update to the first base station or generating the maintenance ticket for the first base station is based on at least determining that the first CA anomaly tracks the first base station;
- determining whether the first CA anomaly tracks the first UE or tracks the first base station comprises determining whether a second CA anomaly exists for a second UE using the first base station;
- determining whether the first CA anomaly tracks the first UE or tracks the first base station comprises determining whether a third CA anomaly exists for a third UE using a second base station at a second radio site;
- determining whether the first CA anomaly tracks the first UE or tracks the first base station comprises determining whether a fourth CA anomaly exists for the first UE when using the second base station;
- the second UE has a different UE type than the UE type of the first UE;
- the third UE has the same UE type as the first UE;
- the plurality of records comprises at least two records selected from an EDR, a CTR or an LSR, and an OSS record or a RAN counter;
- the plurality of wireless network nodes comprises at least a packet routing node carrying data traffic for the first UE and the first base station;
- the target CA configuration for the first UE is based on at least a type of use of the wireless network by the first UE;
- determining the type of use of the wireless network by the first UE;
- the plurality of data records together further identifies bandwidth per available layer for the set of layers available at the first radio site and throughput experienced by the first UE;
- determining a target downlink throughput for the first UE using at least the target CA configuration for the first UE, the bandwidth per available layer, and the radio signal quality experienced by the first UE;
- determining the occurrence of the first CA anomaly comprises comparing the throughput experienced by the first UE with the target downlink throughput;
- the plurality of data records includes two data records selected from the list consisting of an EDR, a CTR or an LSR, and an OSS record or RAN counter;
- determining the UE ID of the first UE;
- determining the UE type of the first UE using the TAC of the IMEI;
- the UE identifier comprises an IMEI or an IMSI;
- the IMEI for the first UE comprises the TAC for the first UE;
- determining the CA capability of the first UE;
- determining the location of the first UE;
- determining the type of use of the wireless network by the first UE;
- determining the type of use of the wireless network by the first UE comprises determining a software application executed by the first UE;
- determining the type of use of the wireless network by the first UE comprises determining whether the UE is using only data without voice or is using voice;
- the EDR identifies the type of use of the wireless network and/or the software application executed by the first UE;
- determining the radio signal quality experienced by the first UE;
- the radio signal quality comprises an RSRP, or an RSRQ, or an SINR;
- the CTR or LSR identifies the radio signal quality;
- determining the throughput and/or the latency experienced by the first UE;
- the plurality of data records together further identifies the throughput and/or latency experienced by the first UE;
- the EDR identifies the throughput and/or latency experienced by the first UE;
- determining the set of layers used by the first UE;
- the CTR or LSR identifies the set of layers used by the first UE;
- determining a count of carriers used by the first UE using the set of layers used by the first UE;
- determining the radio site ID of the first radio site using the location of the first UE;
- determining the set of layers available at the first radio site;
- the OSS record or RAN counter identifies the set of layers available at the first radio site;
- determining the bandwidth per available layer at the first radio site;
- the OSS record or RAN counter identifies the bandwidth per available layer at the first radio site;
- determining the downlink CA usage at the first radio site;
- the RAN counter identifies the downlink CA usage at the first radio site;

determining the downlink buffer size of the first base station for data to transmit to the first UE;
the EDR identifies the downlink buffer size for data to transmit to the first UE;
the packet routing node carrying data traffic for the first UE supplies the EDR;
the first data record comprises the EDR;
the second data record comprises the CTR or LSR;
the packet routing node comprises a UPF;
the first radio site and/or second radio site comprises a gNB;
the packet routing node comprises an SAEGW-U;
the first radio site and/or second radio site each comprises an eNB;
the first base station supplies the CTR or LSR;
the list of remediation measures further includes offloading UEs from the first base station; and
ML determines the target CA configuration;
ML determines the occurrences of the anomalies.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of wireless communication, the method comprising:
receiving a plurality of data records from differing ones of a plurality of wireless network nodes of a wireless network, the plurality of data records including a first data record and a second data record different than the first data record, the plurality of data records together identifying:
a set of layers available at a first radio site, a downlink buffer size of a first base station at the first radio site for data to transmit to a first user equipment (UE), a carrier aggregation (CA) capability of the first UE, radio signal quality experienced by the first UE, and a set of layers used by the first UE;
determining a target CA configuration for the first UE using at least the set of layers available at the first radio site, the downlink buffer size for data to transmit to the first UE, the CA capability of the first UE, and the radio signal quality experienced by the first UE; and
determining an occurrence of a first CA anomaly for the first UE using at least the target CA configuration for the first UE and the set of layers used by the first UE.

2. The method of claim 1, further comprising:
based on at least determining the first CA anomaly, performing a remediation measure selected from the list consisting of:
pushing a software update to the first UE, pushing a configuration update to the first base station, and generating a maintenance ticket for the first base station.

3. The method of claim 2, further comprising:
determining whether the first CA anomaly tracks the first UE or tracks the first base station, wherein pushing the software update to the first UE is based on at least determining that the first CA anomaly tracks the first UE, and wherein pushing the configuration update to the first base station or generating the maintenance ticket for the first base station is based on at least determining that the first CA anomaly tracks the first base station.

4. The method of claim 3, wherein determining whether the first CA anomaly tracks the first UE or tracks the first base station comprises:
determining whether a second CA anomaly exists for a second UE using the first base station, the second UE having a different UE type than the UE type of the first UE; and
determining whether a third CA anomaly exists for a third UE using a second base station at a second radio site or whether a fourth CA anomaly exists for the first UE when using the second base station, the third UE having the same UE type as the first UE.

5. The method of claim 1, wherein the plurality of records comprises at least two records selected from the list consisting of:
an enhanced data record (EDR), a call trace record (CTR) or a location session record (LSR), and an operating support system (OSS) record or a radio access network (RAN) counter.

6. The method of claim 1, wherein the plurality of wireless network nodes comprises at least a packet routing node carrying data traffic for the first UE and a base station located at the first radio site.

7. The method of claim 1, wherein the target CA configuration for the first UE is based on at least a type of use of the wireless network by the first UE, and wherein the method further comprises:
determining the type of use of the wireless network by the first UE.

8. The method of claim 1,
wherein the plurality of data records together further identifies bandwidth per available layer for the set of layers available at the first radio site and throughput experienced by the first UE;
wherein the method further comprises:
determining a target downlink throughput for the first UE using at least the target CA configuration for the first UE, the bandwidth per available layer, and the radio signal quality experienced by the first UE; and
wherein determining the occurrence of the first CA anomaly comprises:
comparing the throughput experienced by the first UE with the target downlink throughput.

9. A system comprising:
a processor; and a computer-readable medium storing instructions that are operative upon execution by the processor to:

receive a plurality of data records from differing ones of a plurality of wireless network nodes of a wireless network, the plurality of data records including a first data record and a second data record different than the first data record, the plurality of data records together identifying:

a set of layers available at a first radio site, a downlink buffer size of a first base station at the first radio site for data to transmit to a first user equipment (UE), a carrier aggregation (CA) capability of the first UE, radio signal quality experienced by the first UE, and a set of layers used by the first UE;

determine a target CA configuration for the first UE using at least the set of layers available at the first radio site, the downlink buffer size for data to transmit to the first UE, the CA capability of the first UE, and the radio signal quality experienced by the first UE; and determine an occurrence of a first CA anomaly for the first UE using at least the target CA configuration for the first UE and the set of layers used by the first UE.

10. The system of claim 9, wherein the instructions are further operative to:

based on at least determining the first CA anomaly, perform a remediation measure selected from the list consisting of:

pushing a software update to the first UE, pushing a configuration update to the first base station, and generating a maintenance ticket for the first base station; and determine whether the first CA anomaly tracks the first UE or tracks the first base station, wherein pushing the software update to the first UE is based on at least determining that the first CA anomaly tracks the first UE, and wherein pushing the configuration update to the first base station or generating the maintenance ticket for the first base station is based on at least determining that the first CA anomaly tracks the first base station.

11. The system of claim 9, wherein the plurality of records comprises at least two records selected from the list consisting of:

an enhanced data record (EDR), a call trace record (CTR) or a location session record (LSR), and an operating support system (OSS) record or a radio access network (RAN) counter.

12. The system of claim 9, wherein the plurality of wireless network nodes comprises at least a packet routing node carrying data traffic for the first UE and a base station located at the first radio site.

13. The system of claim 9, wherein the target CA configuration for the first UE is based on at least a type of use of the wireless network by the first UE, and wherein instructions are further operative to:

determine the type of use of the wireless network by the first UE.

14. The system of claim 9, wherein the plurality of data records together further identifies bandwidth per available layer for the set of layers available at the first radio site and throughput experienced by the first UE;

wherein the instructions are further operative to:

determine a target downlink throughput for the first UE using at least the target CA configuration for the first UE, the bandwidth per available layer, and the radio signal quality experienced by the first UE; and wherein determining the occurrence of the first CA anomaly comprises:

comparing the throughput experienced by the first UE with the target downlink throughput.

15. One or more computer storage devices having computer-executable instructions stored thereon, which, upon execution by a computer, cause the computer to perform operations comprising:

receiving a plurality of data records from differing ones of a plurality of wireless network nodes of a wireless network, the plurality of data records including a first data record and a second data record different than the first data record, the plurality of data records together identifying:

a set of layers available at a first radio site, a downlink buffer size of a first base station at the first radio site for data to transmit to a first user equipment (UE), a carrier aggregation (CA) capability of the first UE, radio signal quality experienced by the first UE, and a set of layers used by the first UE;

determining a target CA configuration for the first UE using at least the set of layers available at the first radio site, the downlink buffer size for data to transmit to the first UE, the CA capability of the first UE, and the radio signal quality experienced by the first UE; and determining an occurrence of a first CA anomaly for the first UE using at least the target CA configuration for the first UE and the set of layers used by the first UE.

16. The one or more computer storage devices of claim 15, wherein the operations further comprise:

based on at least determining the first CA anomaly, performing a remediation measure selected from the list consisting of:

pushing a software update to the first UE, pushing a configuration update to the first base station, and generating a maintenance ticket for the first base station; and determining whether the first CA anomaly tracks the first UE or tracks the first base station, wherein pushing the software update to the first UE is based on at least determining that the first CA anomaly tracks the first UE, and wherein pushing the configuration update to the first base station or generating the maintenance ticket for the first base station is based on at least determining that the first CA anomaly tracks the first base station.

17. The one or more computer storage devices of claim 16, wherein determining whether the first CA anomaly tracks the first UE or tracks the first base station comprises:

determining whether a second CA anomaly exists for a second UE using the first base station, the second UE having a different UE type than the UE type of the first UE; and determining whether a third CA anomaly exists for a third UE using a second base station at a second radio site or whether a fourth CA anomaly exists for the first UE when using the second base station, the third UE having the same UE type as the first UE.

18. The one or more computer storage devices of claim 15, wherein the plurality of records comprises at least two records selected from the list consisting of:

an enhanced data record (EDR), a call trace record (CTR) or a location session record (LSR), and an operating support system (OSS) record or a radio access network (RAN) counter; and wherein the plurality of wireless network nodes comprises at least a packet routing node carrying data traffic for the first UE and a base station located at the first radio site.

19. The one or more computer storage devices of claim 15, wherein the target CA configuration for the first UE is based on at least a type of use of the wireless network by the first UE, and wherein the operations further comprise:

determining the type of use of the wireless network by the first UE.

20. The one or more computer storage devices of claim 15, wherein the plurality of data records together further identifies bandwidth per available layer for the set of layers available at the first radio site and throughput experienced by the first UE;

wherein the operations further comprise:

determining a target downlink throughput for the first UE using at least the target CA configuration for the first UE, the bandwidth per available layer, and the radio signal quality experienced by the first UE; and wherein determining the occurrence of the first CA anomaly comprises:

comparing the throughput experienced by the first UE with the target downlink throughput.

* * * * *